Patented Oct. 20, 1953

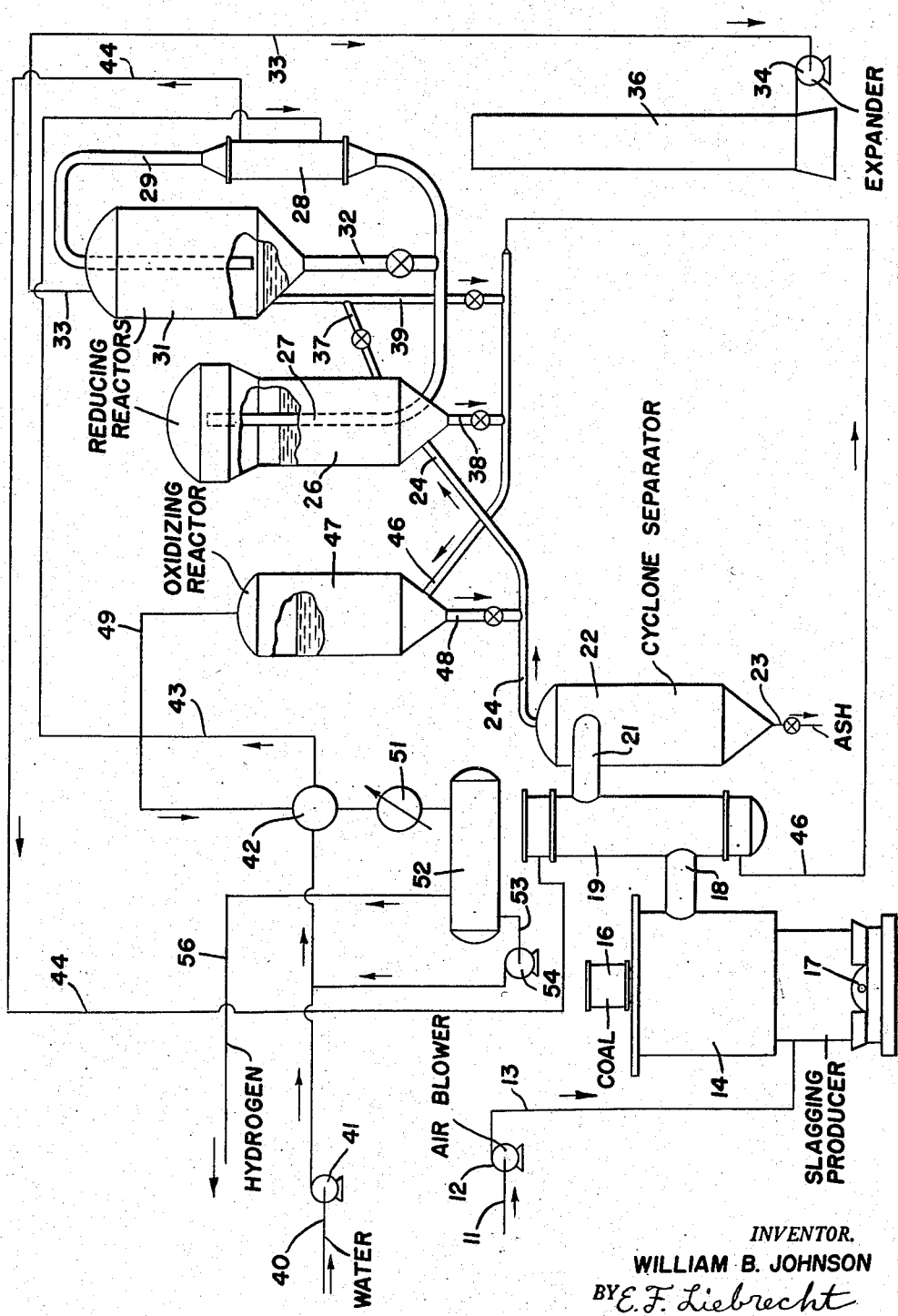

2,656,255

UNITED STATES PATENT OFFICE 2,656,255

MANUFACTURE OF HYDROGEN

William B. Johnson, Far Hills, N. J., assignor to
The M. W. Kellogg Company, Jersey City, N. J.,
a corporation of Delaware Application February 2, 1949, Serial No. 74,213

13 Claims. (Cl. 23—214)

1

This invention relates to the manufacture of hydrogen. In one aspect this invention relates to the manufacture of substantially pure hydrogen from solid carbon containing materials, such as coal, coke and shale, and from hydrocarbons.

One of the most costly features in connection with coal gasification as proposed today is the removal of carbon dioxide from the product gas to raise its heating value or to enrich the gas with hydrogen to produce a gas suitable for the Fischer-Tropsch reaction. Presently proposed systems contemplate coal gasification with steam and oxygen, shifting of the carbon monoxide content with steam to produce carbon dioxide and hydrogen and the final removal of carbon dioxide. An additional disadvantage of coal gasification is that in most instances substantially pure oxygen is recommended in order to eliminate the large amount of nitrogen as a diluent in the product gas. The above disadvantages are also to some extent present in the production of hydrogen or hydrogen containing gases from hydrocarbons. The process of the present invention is directed to a method for the production of hydrogen employing a contact material suspended in the reaction mixture in a novel manner which eliminates or minimizes the aforesaid difficulties in the presently proposed methods.

The object of this invention is to produce substantially pure hydrogen.

Another object of this invention is to produce hydrogen from solid carbon containing materials.

Still another object of this invention is to provide a process for the production of hydrogen from hydrocarbons, particularly relatively high boiling hydrocarbons such as reduced crudes normally undesirable for conversion to hydrogen.

It is another object of this invention to provide a process for the production of a suitable Fischer-Tropsch gas mixture and the conversion thereof to hydrocarbons and oxygenated organic compounds.

It s a further object of the present invention to produce hydrogen from carbon containing materials without the necessity for the removal of carbon dioxide or nitrogen from the product gas.

Yet another and further object is to provide an optimum system for the reduction of metalliferous materials with carbon monoxide.

Various other objects and advantages will become apparent to those skilled in the art from the accompanying description and disclosure.

2

According to this invention, a gas rich in carbon monoxide is produced in a conventional manner such as the gasification of coal by partial oxidation. The carbon monoxide is reacted with a particular metal oxide to be discussed more fully hereinafter under exothermic conditions such that the metal oxide is reduced to a lower oxide or to the elementary metal by suspension in finely-divided form in the carbon monoxide reactant. Appropriate conditions of temperature and contact time are employed to obtain the desired reduction of the metal oxide and to substantially completely convert all of the carbon monoxide to carbon dioxide. Carbon dioxide and any diluents or contaminants of the original carbon monoxide feed mixture are removed from the reaction involving the reduction of the metal oxide and discarded. The reduced metal oxide which, as previously stated, may be in the form of a lower metal oxide or the elementary metal is passed from the reduction step to an oxidation step in which the reduced metal oxide is reacted with steam while suspended in finely-divided form in the steam reactant under endothermic conditions such that the reduced metal oxide is oxidized and steam is converted to hydrogen. Appropriate conditions of temperature and contact time are employed to obtain the required oxidation of the reduced material and to convert the desired proportion of the steam. Substantially pure hydrogen is removed from the oxidation step and recovered by condensing the steam accompanying the hydrogen effluent. The oxidized material from the oxidation step is returned to the reduction step to complete the cycle.

In the process of this invention the metal of the contact material is chosen by the fact that its reduction with carbon monoxide is exothermic and its oxidation with steam is endothermic whereby the step involving the reduction of the metal oxide will liberate a sufficient amount of heat together with the sensible heat supplied thereto by preheating the reactants so that this heat may be employed to furnish substantially all of the required amount of heat for the endothermic oxidation of the reduced metal with steam. The transfer of heat is accomplished by recycling a sufficient quantity of contact material between the reaction zones at the temperature levels of these respective reaction zones such that a balanced heating system is obtained. Excess heat liberated in the reduction of the metal oxide may be removed in a conventional manner, such as by indirect heat exchange with the cooling medium or by the direct injection of a vaporizable liquid into the reduction zone. Suitable metals and/or mixtures thereof which satisfy the requirement of being capable of liberating heat during their reduction and consuming heat during their oxidation comprise nickel, manganese, cobalt and vanadium. The preferred metal employed in the process of the present invention is manganese and under the preferred operating conditions the higher oxide of manganese is reduced to a lower oxide of manganese rather than to the elementary manganese.

According to the preferred embodiment of this invention, the linear gas velocity of the gaseous reactant stream is passed upwardly through the reaction zone in the presence of the suspended contact material at a velocity between about 0.5 and about 6 feet per second such that the finely-divided contact material forms a so-called pseudo-liquid dense phase of solids having a concentration between about 30 and about 120 pounds of metal oxide per cubic foot of gas. This pseudo-liquid dense phase is characterized by the high turbulency and internal circulation of the solid particles within the dense phase.

The contact material is employed in a fine state of subdivision. Preferably, the powdered material initially contains no more than a minor proportion by weight of material whose particle size is greater than about 250 microns. Preferably, also, the greater proportion of the mass of finely-divided material comprises material whose particle size is smaller than 100 microns, preferably between about 20 and about 80 microns. A highly desirable powdered oxide of manganese for use in this invention comprises about 15 per cent between 0 and 20 microns, about 20 per cent between 20 and 40 microns, about 30 per cent between about 40 and 60 microns, about 25 per cent between 60 and 80 microns, and not over 10 per cent above 80 microns.

In the preferred form of this invention, the powdered mass is maintained in a reactor substantially larger than the volume occupied by the mass itself in the fluidized condition. In this operation all but a minor proportion of the catalyst mass is contained in the dense fluidized pseudo-liquid mass which may be designated as the dense phase. The dense phase occupies the lower portion of the reactor while that part of the reactor above the dense phase is occupied by a mixture of gases and powdered solids in which the concentration of solids is much lower and of an entirely different order of magnitude than the concentration of solids in the dense phase. This volume above the dense phase is designated as the dilute or diffuse phase and is considered to be a disengaging zone in which solids lifted above the dense phase by the upward flowing gas stream are disengaged therefrom and returned to the dense phase to the extent that such solids are present in the diffuse phase in excess of the carrying capacity of the gas stream at the linear velocity of that gas stream therein. As used herein, linear velocity is the velocity at which the gas stream would pass through the reaction zone in the absence of solid material. Between the dense phase of high average concentration and the diffuse phase of low average concentration there is a relatively narrow zone in which the concentration of solids in the gas stream changes in a short space from a high concentration of the high phase to the low concentration of the diffuse phase. This zone has the appearance of an interface between two visually distinct phases.

Although the preferred embodiment of this invention constitutes effecting the reactions in the presence of the pseudo-liquid dense phase of finely-divided solids, it is, however, within the scope of this invention to carry out the reactions in which the gaseous stream passing through the reaction zone is of such a high velocity that the finely-divided contact material is entrained or carried in the gaseous stream and circulated in the direction of flow of the gaseous stream through the reaction zone. As a result of the solids being circulated with the gas stream, the solids have a relatively short residence time in the reaction zone, being generally a matter of seconds as compared to a matter of hours with dense phase operations in which the solids possess internal circulation. In this manner of operation, the so-called pseudo-liquid dense phase is not formed but there is a continuous phase of entrained or carried solids in the gaseous stream in the reaction zone. In order to effect the continuous circulation or entrainment of the solids in the gaseous stream, gas velocities above about 6 feet per second are required, usually between about 10 and about 50 feet per second. At such high gas velocities at which the pseudo-liquid dense phase is not formed but instead a continuous phase is formed, the concentration of solids in the gaseous stream is much lower than that experienced with the pseudo-liquid dense phase. In the high velocity system, the concentration of solids in the gas stream is less than about 25 pounds per cubic foot of gas and usually between about 3 and about 18 pounds per cubic foot of gas. The actual concentration within the above range will depend upon such factors as gas velocity, reactants, type and size of reactor, etc.

As used herein, the suspension of finely-divided solids in a gaseous stream refers to either the high velocity continuous phase technique or to the pseudo-liquid dense phase technique.

In the relatively low velocity dense phase operation, gas velocities are ordinarily employed which result in a small proportion of the solids being carried overhead from the reaction zone with the reaction effluent, and, as a consequence thereof, it is necessary to provide means in the reactor itself or externally for separating such entrained solids and returning them to the dense phase. When operating with a relatively high velocity continuous phase, separation means must be provided for removing the bulk of the solids from the reaction effluent and returning it to the reaction zone; also, means must be provided for recovering a small amount of entrained solids after removal of the bulk of the solids from the effluent. The recovered solids in either case may be returned to the reaction zone.

In a preferred modification of this invention the metalliferous contact material, such as an oxide of manganese, may be combined with a suitable conversion promoter or promoters by impregnating the manganese oxide with a minor amount of such a promoter or by introducing separate particles of the promoter in admixture with the oxide of manganese into the reaction zone. Such promoters comprise iron, thoria, tungsten, copper, etc. It may also be desirable to maintain the metal oxide on a suitable inert material as a support or carrier, or it may be desirable to have such inert material present in the reaction zone itself as separate particles from the oxides of manganese, as a diluent. This inert material may serve as a heat carrier and also may serve in aiding in the suspension and fluidization of the metal oxide. Such inert materials suitable as diluents or carriers comprise silica, alumina, magnesia, bentonite type clays as "Filtrol" and "Super-Filtrol" (acid treated bentonite), and various materials known to those skilled in the art. If present as separate particles in admixture with the oxygen carrier, the inert material is of a size within the ranges previously discussed with reference to the manganese oxide. The various metals suggested as appropriate contact materials for this invention may be used alone or in combination with each other and in combination with promoters and supports. For example, a combination of manganese and cobalt oxides may be employed.

The controlling temperature of the process is the temperature employed in the reaction involving the oxidation of the reduced metalliferous material whereby steam is converted to hydrogen. This temperature depends primarily upon the rate of reaction and upon the equilibrium or conversion of steam to hydrogen. Since the conversion of steam to hydrogen in the presence of the metal oxides suggested for this invention is favored by relatively low temperatures, low temperatures are preferred; however, employing a very low temperature results in such a slow rate of reaction that the process becomes commercially unfeasible. It is recommended that in general a temperature of below 1100° F. be employed in all instances to obtain an optimum equilibrium or conversion and yet a sufficiently high temperature to obtain an appropriate rate of reaction. When employing an oxide of manganese a temperature between about 800 and about 1100° F. is considered satisfactory from the standpoint of conversion and rate of reaction. Since the equilibrium and rate of reaction is not substantially affected by pressure the pressure employed usually will be that pressure desired for the product gas.

The temperature conditions of the reduction step involving the reduction of the oxidized contact material with carbon monoxide will depend upon the temperature employed in the hydrogen producing step previously described. Since the reduction of the particular metal oxides of this process with carbon monoxide is exothermic and it is a feature of this invention to employ the heat thus liberated for supplying the necessary heat in the hydrogen producing step, it is preferred to maintain the temperature at least 100° F. above the hydrogen producing step temperature. Preferably, the temperature of this latter step is at least 200° F. above the hydrogen producing step so that rapid heat transfer may be obtained between the finely-divided contact material circulated between the exothermic and endothermic reaction zones. Since the equilibrium for the reduction of metal oxide with carbon monoxide is favored in the direction of the consumption of carbon monoxide by relatively low temperatures, it is desirable to use as low a temperature as possible for this purpose. In accordance with one modification of this invention, two steps are employed for the reduction of the metal oxide with carbon monoxide. The first step employs a relatively high temperature in order to supply the required heat to the hydrogen producing step or endothermic reaction zone and subsequently the unconverted carbon monoxide and unreduced metal oxide from the first step are subjected to a lower heat treatment in a second step at which the equilibrium is more favorable to the consumption of carbon monoxide. In this manner substantially complete utilization of the carbon monoxide is obtained. This feature of the invention will be more fully described in connection with the accompanying drawings to be hereinafter discussed. Any pressure may be employed on reduction of the metal oxide with carbon monoxides as this reaction is not materially influenced by pressure.

It is within the scope of this invention to operate one reaction zone according to the high velocity continuous phase technique and to operate another reaction zone according to the relatively low velocity dense phase technique. For example, the endothermic reaction zone or hydrogen producing zone may be operated such that finely-divided solids are carried by entrainment in the gaseous reaction mixture and are removed together with the reaction mixture and products from that reaction zone and passed to a conventional solids separator, such as a cyclone separator. The solids removed from the effluent gases in the solids separator are then returned to the inlet to the reaction zone, such as by means of a standpipe or a Fuller Kinyon pump, to be recycled through the reaction zone. The exothermic reaction zone or the zone in which the metal oxide is reduced with carbon monoxide may be operated simultaneously by the dense phase technique as previously discussed and finely-divided contact material circulated between the two reaction zones in the required amount and conventional manner.

The accompanying drawing is a diagrammatic illustration in elevation of an arrangement of apparatus for carrying out the process of this invention for the production of substantially pure hydrogen from coal employing manganese as the contact material. The reaction conditions and specific illustrations given in the description of the drawing are those preferred and best suited for the process described, but should not be considered as unnecessarily limiting the invention. As the basis for better understanding of the present invention, the process of the drawing will be described with respect to the production of 100 mols of hydrogen per hour. It is to be understood that although the drawing is limited to the production of hydrogen from coal the process of the present invention may apply to the production of hydrogen from light and heavy hydrocarbons, reduced crudes and high sulfur content crudes, such as a Santa Maria crude.

According to the drawing, air is passed through conduit 11 to blower 12 at which point it is compressed to the desired pressure which will be somewhat higher than the pressure desired for the product gas. About 62,000 cubic feet per hour of air are compressed to 50 pounds per square inch gage and passed through conduit 13 to a conventional slagging type producer 14. Approximately 1,440 pounds per hour of coal or coke are introduced into producer 14 by means of inlet conduit 16. The gasification temperature of the producer is maintained between about 1800 and about 2200° F. Approximately 260 pounds per hour of liquid slag is removed from tap hole 17. Effluent gas at a temperature of about 1500° F. is removed from producer 14 and passed through conduit 18 to a steam superheater or heat exchanger 19 where the effluent is cooled to about 830° F. by indirect heat exchange with steam in conduit 44. The effluent from the slagging producer is removed from heat exchanger 19 and passed to a conventional cyclone separator 22 through conduit 21 in order to remove fly ash. About 34 pounds per hour of fly ash are removed from cyclone separator 22 through bottom draw off conduit 23. A typical composition of the effluent gas of producer 14 at this point is shown below:

| Component | Mol Percent |
|---|---|
| $CO_2$ | 2.4 |
| CO | 32.0 |
| $H_2$ | 4.0 |
| $CH_4$ | 3.5 |
| $N_2$ | 58.0 |

Excess coal is employed in producer 14 in order to minimize conversion of the coal to carbon dioxide. Although the process has been described with the use of air, substantially pure oxygen may be employed in producer 14. Since the present process has as one of its advantages the use of air without the accompanying contamination of the product with nitrogen, the employment of oxygen is economically unfeasible.

About 230 mols per hour of effluent gas containing carbon monoxide and nitrogen is passed through conduit 24 to exothermic reducing chamber 26 in which it contacts a finely-divided oxide of manganese contained therein in a pseudo-liquid fluidized condition in the form of a fluid bed, as shown. This reaction chamber is maintained at a temperature of about 1200° F. by the preheat of the feed gas and the exothermic nature of the reaction, such that metal oxides are reduced and carbon monoxide is converted to carbon dioxide. At the temperature of reaction employed in chamber 26 a substantial portion of the carbon monoxide remains unconverted, and, in order to substantially completely convert this carbon monoxide, finely-divided manganese oxide and unconverted carbon monoxide are passed to a second step (chamber 31) employing lower temperatures more favorable to the consumption of carbon monoxide. Excess oxides of manganese are present in chamber 26 at all times in order that sufficient manganese oxide will be present in the second step to convert substantially all of the carbon monoxide and for acting as a heat carrier for transferring heat from reaction chamber 26 to the subsequent hydrogen producing step (chamber 47). A typical composition of the effluent gas from reaction chamber 26 is as follows:

| Component | Mol Percent |
|---|---|
| $CO_2$ | 25.9 |
| CO | 9.6 |
| $H_2$ | 4.4 |
| $N_2$ | 54.2 |
| $H_2O$ | 5.9 |

The effluent from chamber 26 of the above composition is withdrawn therefrom in an amount of 2,462 mols per hour through conduit 27 which contains an inlet above the interface in reactor 26, as shown. Gases are passed through conduit 27 to a heat exchanger or boiler 28 which cools the mixture of gases and entrained solids from a temperature of about 1200° F. to about 400° F. The velocity of the gaseous stream in conduit 27 is sufficiently high to entrain the contact material and continuously move it in the direction of flow of the gases upwardly through boiler 28 and conduit 29 to separator and reaction chamber 31. In conduit 29 the exothermic reaction of the carbon monoxide with the metal oxide raises the temperature to about 600° F. and the contact material settles to the bottom of chamber 31. The feed to boiler 28 is adjusted to keep the maximum temperature obtained in conduit 29 below about 700° F. It is preferred to maintain the outlet of conduit 29 adjacent to the bottom of chamber 31, as shown. Contact material from chamber 31 may be recirculated to conduit 27 by means of a conventional standpipe 32, thus assuring substantially complete conversion of carbon monoxide and reduction of the metal oxide to the desired lower oxide. An effluent is removed from chamber 31 through conduit 33 and is expanded at about 20 pounds per square inch gage and 600° F. to atmospheric pressure through expander 34 to utilize the energy contained therein. Expander 34 may generate electricity for the process. This reduces the temperature of the effluent to about 365° F. and the effluent thus expanded is vented to the atmosphere through stack 36. A typical composition of the effluent at this point is as follows:

| Component | Mol Percent |
|---|---|
| $CO_2$ | 34.4 |
| CO | 1.1 |
| $H_2$ | 5.0 |
| $N_2$ | 54.2 |
| $H_2O$ | 5.3 |

The amount of gas vented through stack 36 is about 246 mols per hour.

About 3,400 pounds per hour of reduced metal oxides from secondary reducing reactor 31 are passed therefrom through conduit 37 to primary reducing reactor 26. From primary reducing reactor 26 finely-divided reduced contact material is removed through standpipe 38 for passage to oxidation or hydrogen producing reactor 47 where it is contacted with steam under endothermic conditions such that the reduced contact material is oxidized and hydrogen is produced. If desired, substantially completely reduced contact material may be removed from secondary reducing reactor 31 through conduits 37 and 39 simultaneously with removal of contact material from reactor 26 through conduit 38, and passed to reactor 47. Alternatively, all of the reduced contact material passed to reactor 47 may be obtained directly from reactor 31 by removal through standpipes or conduits 37 and 39. This latter modification may be particularly desirable since the contact material will possess a uniform state of reduction which will enable smooth and continuous operations.

In order to operate oxidation reactor 47, 1800 pounds per hour of water are passed through conduit 40 by means of pump 41 through heat exchanger 42, conduit 43, to boiler 28. In boiler 28 the water is heat exchanged with the effluent from reactor 26, as previously discussed, and vaporized. Steam is removed from boiler 28 and passed through conduit 44 to heat exchanger and superheater 19 in which the steam is heat exchanged with the effluent gases from slagging producer 14, as previously discussed. The temperature of the steam entering superheater 19 is about 340° F. and the temperature of the steam leaving heat exchanger 19 through conduit 46 is about 1200° F. The quantity of steam at this point is about 3,600 pounds per hour since water condensed from the effluent of reactor 47 is combined with the fresh feed water in conduit 40 by means of conduit 53.

Steam at approximately 1200° F. is passed through conduit 46 to oxidizing reactor 47. Approximately 62,600 pounds per hour of manganese oxide are introduced into conduit 46 through conduit 38 from the bottom of reactor 26. The finely-divided reduced metal oxide is suspended in the steam and carried to the bottom of reactor 47. This quantity of metal oxide at the temperature thereof and the temperature of the superheated steam assures a reaction temperature in reactor 47 of about 1000° F. The upward gas velocity in reactor 47 is sufficient to maintain the finely-divided contact material suspended in a pseudo-liquid fluidized condition with an interface in the reactor, as shown. Since excess steam is employed the effluent in conduit 49 consists substantially of hydrogen and steam in a mol ratio of approximately 1:1. Reduced contact material is oxidized in reactor 47 and is removed from the bottom thereof by means of standpipe 48 and returned to the bottom of reducing reactor 26 by introduction into conduit 24. Approximately 64,200 pounds per hour of a higher oxide of manganese are returned by this means to reactor 26. In a modification, all or a portion of the contact material withdrawn from reactor 47 may be passed directly to reactor 31 by means not shown from where it is passed to reactor 26 through conduit 37.

The principal source of heat for the endothermic reaction effected in reactor 47 is the sensible heat of the circulated contact material from reactor 26. In the preferred embodiment of this invention, substantially all of the heat except that supplied by superheating the steam is supplied to reactor 47 from the hot contact material from reactor 26. Nevertheless, it is within the scope of this invention to supply a minor proportion of the heat required for the endothermic reaction in reactor 47 by other means such as indirect heat exchange with furnace gases or the direct injection of hot gases into reactor 47.

The effluent from reactor 47 comprising hydrogen and excess steam and free from nitrogen is discharged through conduit 49 and passed through heat exchanger 42 in which a portion of its heat is transferred to the incoming feed water. From heat exchanger 42 the effluent is passed through condenser 51 in which the steam is condensed and the cooled effluent is passed to an accumulator 52. Water is withdrawn from unit 52 through conduit 53 and circulated by means of pump 54 to inlet feed line 40. About 1,800 pounds per hour of water are returned to the system in this manner. Hydrogen substantially free from water and other impurities is removed from accumulator 52 through conduit 56 at the desired pressure as the product of the process.

If it is desired to obtain hydrogen at substantially elevated pressures as the product of the process, an additional compressor may be positioned on conduit 24 to compress the reactant carbon monoxide to the desired pressure. The reaction chambers are operated at substantially the same pressures in order that standpipes may be employed for transferring contact material therebetween. However, the reactors may be operated at different pressures if desired by using other means for compressing the contact material, such as by a Fuller Kinyon pump.

In the case in which the carbon-containing material of the feed is natural gas or other hydrocarbon, the partial combustion thereof will result in the production of hydrogen and carbon monoxide. This hydrogen is utilized in the process in the reduction of the metal oxides in reactors 26 and 31 so that there is no loss of hydrogen in the system. In the use of a Santa Maria crude the sulfur which may be in the form of hydrogen sulfide or the oxide passes through reactors 26 and 31 without substantial impairment of the reactions being effected therein; consequently, the process is particularly adaptable to the use of high sulfur crudes which ordinarily cannot be employed because of their sulfur content.

In the process of this invention the principal source of hydrogen is the conversion of steam in reactor 47 by means of reaction with the reduced contact material. It is also contemplated that the reaction of steam with a reduced contact material as described above is the sole source of hydrogen produced. Similarly, the principal source of the reducing gas for reducing the oxidized contact material in reactors 26 and 31 is carbon monoxide when a solid carbon containing material is the feed and carbon monoxide and hydrogen when a hydrocarbon is the feed.

In the event the hydrogen produced is employed as one of the reactants to make up the synthesis feed gas in the Fischer-Tropsch reaction, the carbon monoxide necessary for this feed may be produced in a separate producer (not shown) by the conversion of coal or coke with substantially pure oxygen or enriched air. The product in this step is substantially pure carbon monoxide free from nitrogen. This carbon monoxide is then combined in the desired ratio with the hydrogen produced, as described previously, and the feed thus obtained is utilized under conventional conditions of temperature, pressure, contact time and catalyst to produce hydrocarbons and oxygenated organic compounds by the Fischer-Tropsch reaction. Making the Fischer-Tropsch feed gas in this manner rather than by partial combustion of hydrocarbons with pure eoxygen or by conversion of coal and steam with the required oxygen to maintain the desired temperature reduces the requirement of pure oxygen by about 50 per cent. The reduction of the required oxygen by this method is a substantial monetary saving in the synthesis process.

Various modifications of the process and the apparatus employed may become apparent to those skilled in the art without departing from the scope of this invention. Certain pieces of apparatus, such as pumps, storage vessels, valves, conduits, recycle lines, etc., have been omitted from the drawing as a matter of clarity and convenience, and their location and use will be obvious to those skilled in the art.

Having described my invention, I claim:

1. A process for producing hydrogen which comprises combusting carbon containing material with oxygen containing gas under conditions suitable for the production of a major proportion of carbon monoxide and a minor proportion of carbon dioxide, passing excess steam upwardly through an oxidizing zone in the presence of finely divided reduced metalliferous contact material at a velocity effective to suspend the contact material in a pseudo-liquid condition at a temperature below about 1100° F. but sufficiently high such that hydrogen is produced under endothermic conditions at a desired rate by the reaction of steam with the contact material and the contact material is oxidized, passing oxidized contact material from the oxidizing zone to a first reduction zone, passing carbon monoxide which is prepared from combusting carbon containing material in excess upwardly through said first reduction zone at a velocity effective to suspend the oxidized contact material in a pseudo-liquid condition therein at a temperature significantly above the temperature of said oxidizing zone under exothermic conditions such that the metalliferous contact material is reduced by the carbon monoxide which is converted to carbon dioxide and the heat generated therein is sufficient to constitute the principal source of heat for the oxidizing zone, passing a relatively small proportion of contact material from the first reduction zone to a second reduction zone wherein the contact material is further reduced by the unconverted carbon monoxide from the first reduction zone at a temperature below about 700° F. but sufficiently high to obtain the desired rate of reaction, removing an effluent from the said second reduction zone comprising carbon dioxide and substantially free of carbon monoxide, recycling reduced metalliferous contact material to the said oxidizing zone at a temperature and in an amount sufficient to constitute the principal source of heat thereto, at least a portion of the reduced contact material is recycled from the first reduction zone, and recovering hydrogen from the oxidizing zone as the product of the process.

2. The process of claim 1 wherein the carbon containing material is coal.

3. The process of claim 1 wherein the carbon containing material is a hydrocarbon.

4. The process of claim 1 wherein the carbon containing material is a sulfur bearing crude.

5. The process of claim 1 wherein the carbon containing material is a shale.

6. A process for producing hydrogen from coal which comprises the steps of combusting excess coal with air at a temperature between about 1800 and about 2200° F. under conditions such that carbon monoxide is produced as a major product and carbon dioxide is produced in only a minor proportion, passing excess steam upwardly through an oxidizing zone in the presence of finely-divided reduced metalliferous material at a velocity effective to suspend said finely-divided material in a pseudo-liquid condition at a temperature below about 1100° F. but sufficiently high such that hydrogen is produced under endothermic conditions at a desired rate by the reaction of steam with said contact material whereby the contact material is oxidized, passing oxidized contact material from said oxidizing zone to a first reduction zone, passing carbon monoxide produced in said coal combustion step in excess upwardly through said first reduction zone in the presence of finely-divided oxidized metalliferous contact material at a velocity effective to suspend said finely-divided contact material in a pseudo-liquid condition therein at a temperature at least 100° F. above the temperature of said oxidation zone under exothermic conditions such that the metalliferous contact material is reduced by carbon monoxide which is converted to carbon dioxide, removing from said first reduction zone an effluent containing a relatively small proportion of unconverted carbon monoxide and suspended contact material and passing same to a separate second low temperature reduction zone in which the remaining unconverted carbon monoxide from said first reduction zone reduces unreduced metalliferous contact material suspended in the reaction mixture at a temperature below about 700° F. but at a sufficiently high temperature to obtain the desired rate of reaction, recovering reduced metal oxide from said second reduction zone and returning same to said first reduction zone, removing an effluent from said second reduction zone comprising carbon dioxide and substantially free from carbon monoxide, passing reduced metalliferous contact material from said first reduction zone to said oxidation zone at a temperature and in an amount sufficient to constitute the principal source of heat to said oxidizing zone, and recovering hydrogen free from nitrogen from said oxidizing zone as the product of the process.

7. A process for producing hydrogen which comprises the steps of passing excess steam upwardly through an oxidizing zone in the presence of finely divided reduced metalliferous contact material at a velocity effective to suspend the finely divided material in a pseudo-liquid condition at a temperature below about 1100° F. but sufficiently high such that hydrogen is produced under endothermic conditions at a desired rate by the reaction of steam with the contact material and the contact material is oxidized, passing oxidized contact material from the oxidizing zone to a first reduction zone, passing carbon monoxide in excess upwardly through the first reduction zone in the presence of the finely divided oxidized contact material at a velocity effective to suspend the contact material in a pseudo-liquid condition therein at a temperature significantly above the temperature of the oxidizing zone under exothermic conditions such that the contact material is reduced by the carbon monoxide which is converted to carbon dioxide and the heat generated therein is sufficient to constitute the principal source of heat for the oxidizing zone, passing a relatively small proportion of contact material from the first reduction zone to a second reduction zone wherein the contact material is further reduced by the unconverted carbon monoxide from the first reduction zone at a temperature below about 700° F. but sufficiently high to obtain the desired rate of reaction, removing an effluent from the second reduction zone comprising carbon dioxide and substantially free of carbon monoxide, recycling reduced metalliferous contact material to the said oxidizing zone at a temperature and in an amount sufficient to constitute the principal source of heat thereto, at least a portion of the reduced contact material is recycled from the first reduction zone, and recovering hydrogen from the oxidizing zone as the product of the process.

8. The process of claim 7 in which the metalliferous contact material comprises manganese.

9. The process of claim 7 in which the metalliferous contact material is cobalt.

10. The process of claim 7 in which the metalliferous contact material comprises cobalt and manganese.

11. The process of claim 7 in which the metalliferous contact material comprises vanadium.

12. A process for producing hydrogen which comprises the steps of passing excess steam upwardly through an oxidizing zone in the presence of finely-divided reduced metalliferous material at a velocity effective to suspend said finely-divided material in a pseudo-liquid condition at a temperature below about 1100° F. but sufficiently high such that hydrogen is produced under endothermic conditions at a desired rate by the reaction of steam with said contact material whereby the contact material is oxidized, passing oxidized contact material from said oxidizing zone to a first reduction zone, passing carbon monoxide in excess upwardly through said first reduction zone in the presence of finely-divided oxidized metalliferous contact material at a velocity effective to suspend said finely-divided contact material in a pseudo-liquid condition therein at a temperature at least 100° F. above the temperature of said oxidation zone under exothermic conditions such that the metalliferous contact material is reduced by carbon monoxide which is converted to carbon dioxide, removing from said first reduction zone an effluent containing a relatively small proportion of unconverted carbon monoxide and suspended contact material and passing same to a separate second low temperature reduction zone in which the remaining unconverted carbon monoxide from said first reduction zone reduced unreduced metalliferous contact material suspended in the reaction mixture at a temperature below about 700° F. but at a sufficiently high temperature to obtain the desired rate of reaction, recovering reduced metal oxide from said second reduction zone and returning same to said first reduction zone, removing an effluent from said second reduction zone comprising carbon dioxide and substantially free from carbon monoxide, passing reduced metalliferous contact material from said first reduction zone to said oxidation zone in an amount sufficient to constitute the principal source of heat to said oxidizing zone, and recovering substantially pure hydrogen from said oxidizing zone as the product of the process.

13. A process for producing hydrogen which comprises the steps of combusting excess coal with air under suitable conditions for the production of a major proportion of carbon monoxide and a minor proportion of carbon dioxide, passing excess steam upwardly through an oxidizing zone in the presence of finely divided reduced manganese oxide at a velocity effective to suspend the reduced manganese oxide in a pseudo-liquid condition at a temperature below about 1100° F. but sufficiently high such that hydrogen is produced under endothermic conditions at a desired rate by the reaction of steam with the reduced manganese oxide whereby the reduced manganese oxide is oxidized, passing the oxidized manganese oxide from the oxidizing zone to the first reduction zone, passing carbon monoxide produced in the combustion step in excess upwardly through the first reduction zone in the presence of finely divided oxidized manganese oxide at a velocity effective to suspend the oxidized manganese oxide in a pseudo-liquid condition therein at a temperature of at least about 200° F. above the temperature of the oxidizing zone under exothermic conditions such that the oxidized manganese oxide is reduced by carbon monoxide which is converted to carbon dioxide, passing a relatively small proportion of partially reduced manganese oxide to a second reduction zone wherein it is further reduced by the unconverted carbon monoxide from the first reduction zone at a temperature below about 700° F. but sufficiently high to obtain the desired rate of reaction, removing an effluent from the second reduction zone comprising carbon dioxide and substantially free of carbon monoxide, recycling reduced manganese oxide to the said oxidizing zone at a temperature and in an amount sufficient to constitute the principal source of heat thereto, at least a portion of the reduced manganese oxide is recycled from the first reduction zone, and recovering hydrogen from the oxidizing zone as the product of the process.

WILLIAM B. JOHNSON.

References Cited in the file of this patent

UNITED STATES PATENTS

| Number | Name | Date |
|---|---|---|
| 2,449,635 | Barr | Sept. 12, 1948 |

FOREIGN PATENTS

| Number | Country | Date |
|---|---|---|
| 220,676 | Great Britain | Aug. 21, 1924 |
| 586,914 | Great Britain | Apr. 8, 1947 |

OTHER REFERENCES

Morgan, "American Gas Practice," vol. I, pages 70–74.

Ellis, "Hydrogenation of Organic Substances," 3d Edition, pages 715–718.